United States Patent [19]

Robins et al.

[11] 3,897,415
[45] July 29, 1975

[54] 5-SUBSTITUTED 1,2,4-TRIAZOLE-3-CARBOXAMIDO NUCLEOSIDES AND ANALOGS THEREOF

[75] Inventors: Roland K. Robins, Santa Ana; Joseph T. Witkowski, Laguna Niguel, both of Calif.

[73] Assignee: ICN Pharmaceuticals, Inc., Irvine, Calif.

[22] Filed: Sept. 28, 1972

[21] Appl. No.: 292,929

Related U.S. Application Data

[63] Continuation-in-part of Ser. No. 240,252, March 31, 1972, Pat. No. 3,798,209, which is a continuation-in-part of Ser. No. 149,017, June 1, 1971, abandoned.

[52] U.S. Cl............................ 260/211.5 R; 424/180
[51] Int. Cl............................................. C07d 51/50
[58] Field of Search ............................. 260/211.5 R

[56] References Cited
UNITED STATES PATENTS
3,074,930  1/1963  Hitchings et al............. 260/211.5 R
3,516,985  6/1970  Walton et al. ............... 260/211.5 R OTHER PUBLICATIONS
Witkowski, et al., "Jour. Org. Chem.," Vol. 35, No. 8, 1970, pp. 2635–2639 (P. 2638 pertinent).
Tipson, "Advances in Carbohydrate Chemistry and Biochemistry," Vol. 25, Academic Press, New York, N.Y., 1970, pp. 387 & 388.

*Primary Examiner*—Johnnie R. Brown
*Attorney, Agent, or Firm*—Lyon & Lyon

[57]  ABSTRACT

Disubstituted 1,2,4-triazole nucleosides, e.g., those of structure

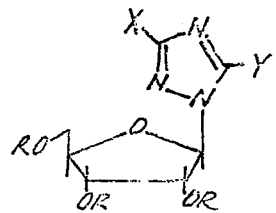

wherein R is hydrogen or acyl and X and Y are differently selected from the group consisting of halogen, carboxamide and carboxylic acid ester groups are prepared by a method comprising fusion of an appropriately substituted 1,2,4-triazole with a tetra-O-acyl blocked ribofuranose. Disubstituted 1,2,4-triazole nucleosides prepared according to the invention have variously exhibited antimicrobial and antiviral activity in vitro, while others are useful in the preparation of such compounds.

10 Claims, No Drawings

5-SUBSTITUTED 1,2,4-TRIAZOLE-3-CARBOXAMIDO NUCLEOSIDES AND ANALOGS THEREOF

CROSS-REFERENCE TO RELATED APPLICATIONS

This is a continuation-in-part of our copending application Ser. No. 240,252, filed Mar. 31, 1972, now U.S. Pat. No. 3,798,209 which was in turn a continuation-in-part of our application Ser. No. 149,017, filed June 1, 1971 and now abandoned.

BACKGROUND AND SUMMARY OF THE INVENTION

Our aforesaid copending applications, whose disclosures are expressly incorporated herein by reference in order to illuminate the background of this invention, deal with 1-β-D-ribofuranosyl-1,2,4-triazole-3-carboxamide and related mono-substituted 1,2,4-triazole nucleosides. We conceived certain 5-substituted analogs of those compounds as potentially potent antimetabolites, and our investigation of the synthesis of those analogs was spurred on by the broad spectrum in vitro antiviral activity discovered in the case of the mono-substituted triazole nucleosides. However, our efforts to introduce substitutents into the 5-position of 1,3-disubstituted-1,2,4-triazoles by electrophilic substitution (eg, bromination, chlorination) were unsuccessful. We have now obtained 3,5-disubstituted-1,2,4-triazole nucleosides which variously exhibit antimicrobial or antiviral activity or which are useful in the preparation of such nucleosides, all by a procedure which entails the fusion of a tetra-O-acyl blocked ribofuranose with a 1,2,4-triazole of structure

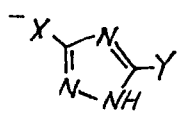

wherein X is a carboxylic acid ester and Y is halogen or nitro.

DETAILED DESCRIPTION OF THE INVENTION

The compounds of the invention are obtained by first fusing tetra-O-acyl blocked ribofuranose and appropriately substituted 1,2,4-triazoles. While essentially any acyl moiety may be employed for glycosyl blocking, workup is facilitated where the 1-O-leaving group forms a relatively volatile acid, eg, where the 1-O-position of ribofuranose is blocked with a $C_1$–$C_4$ acyl group such as acetyl, propionyl or butyryl. Preferred compounds are formed according to the following schema, wherein Ac is acetyl.

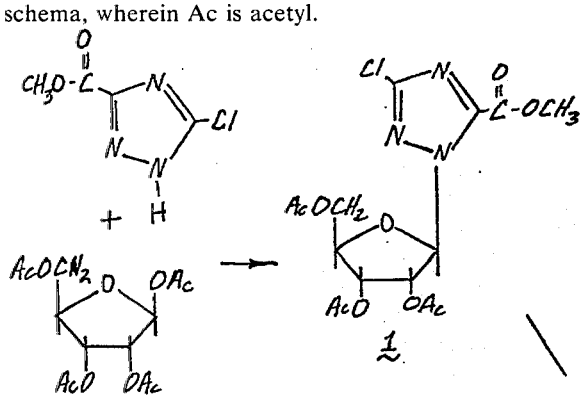

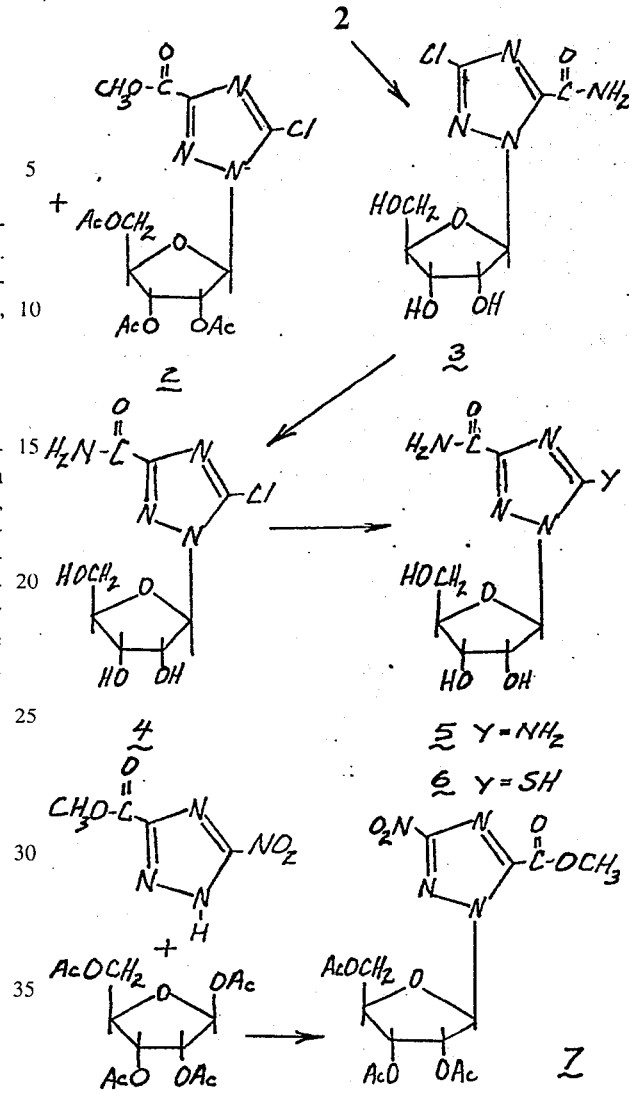

Fusion of 3-chloro-1,2,4-triazole-5-carboxylic acid methyl ester prepared as in Khim. Geterotsikl, Soedin, Sbil: Azotsoderzhaschie Geterosikly, 1967, 180 [Chem. Abstracts, 70, 77876t (1969)] with 1,2,3,5-tetra-O-acetyl-β-D-ribofuranosyl in the presence of acidic catalyst provides a mixture of 3-chloro-1-(2,3,5-tri-O-acetyl-β-D-ribofuranosyl)-1,2,4-triazole-5-carboxylic acid methyl ester (1) and 5-chloro-1-(2,3,5-tri-O-acetyl-β-ribofuranosyl)-1,2,4-triazole-3-carboxylic acid methyl ester (2). The particular carboxylic acid ester group of the starting base is not critical, as its alkoxy component as split off in following steps by which bioactive compounds of the invention are secured. Again, for ease of workup, lower carboxylic acid esters such as carbomethoxy or carboethoxy groups are preferred. Separation of 1 and 2 by chromatography over silica gel followed by treatment with methanolic ammonia separately provides 3-chloro-1-β-D-ribofuranosyl-1,2,4-triazole-5-carboxamide (3) and 5-chloro-1-β-D-ribofuranosyl-1,2,4-triazole-3-carboxamide (4). Analogous compounds in which the halogen is other than chloro may be secured by appropriate choice of starting base. If desired in any case, glycosyl hydroxyl blocking groups may be removed before conversion of 1 and 2 to the carboxamides, as by reaction with sodium methoxide in methanol.

By a procedure like that for 3 and 4, starting with 3-methyl-1,2,4-triazole-5-carboxylic acid methyl ester prepared as in Khim. Geterosikl. Soedin. 1970, 1695, we have also prepared the nucleosides 3-methyl-1-β-D-ribofuranosyl-1,2,4-triazole-5-carboxamide and 5-methyl-1-β-D-ribofuranosyl-1,2,4-triazole-3-carboxamide.

Nucleophilic displacement of the chloro group in 5-chloro-1-β-D-ribofuranosyl-1,2,4-triazole-3-carboxamide (4) provides a convenient route to the corresponding 5-substituted nucleosides. Treatment of 4 with liquid ammonia at 100° thus gives 5-amino-1-β-D-ribofuranosyl-1,2,4-triazole-3-carboxamide (5). Similarly, 1-β-D-ribofuranosyl-1,2,4-triazole-3-carboxamide-5-thiol (6) may be obtained on treatment of 4 with sodium hydrosulfide.

The fusion procedure with 3-nitro-1,2,4-triazole-5-carboxylic acid methyl ester prepared as in *Khim. Geterosikl, supra*, and 1,2,3,5-tetra-O-acetyl-β-D-ribofuranose in the absence of an acidic catalyst affords the single nucleoside product 3-nitro-1-(2,3,5-tri-O-acetyl-β-D-ribofuranosyl)-1,2,4-triazole-5-carboxylic acid methyl ester (7), which may be converted to 3-nitro-1-β-D-ribofuranosyl-1,2,4-triazole-5-carboxamide by treatment with methanolic ammonia. The free nucleoside 3-nitro-1-β-D-ribofuranosyl-1,2,4-triazole-5-carboxylic acid methyl ester may be obtained from 7 by reaction with sodium methoxide.

Free nucleosides prepared according to the invention may be acylated for enhanced lipid solubility and cellular transport. In that event $C_1$–$C_{18}$, preferably $C_1$–$C_4$, acyl groups are added by reaction of glycosyl hydroxyls with the appropriate acyl halide or acid anhydride in conventional fashion.

In the case of the following Examples of preferred embodiments of the invention melting points were determined on a Thomas-Hoover apparatus and are uncorrected. Evaporations were accomplished with a Buchler rotating evaporator under reduced pressure with a bath temperature of 35°. Merck silica gel (0.05–0.2 mm) was used for chromatographic separations. All parts and percentages are by weight unless otherwise indicated, and all temperatures in degrees Centigrade.

Antibacterial activity was determined according to the following protocol. The microorganism is transferred from a stock culture, suspended in a nutrient broth and incubated overnight. After mixing, a small aliquot (ca. 0.02 ml) of the liquid culture is transferred to a second tube of a nutrient broth and again mixed. One such tube is prepared for each petri dish to be inoculated.

Prior to inoculation, a solid nutrient medium is prepared and poured in the petri dish, allowed to cool and harden, and then inoculated by pouring the previously prepared suspension of micro-organisms on the surface. After approximately 5 minutes, the suspension is poured off, and the petri dish is inverted and allowed to dry for 45–60 min.

The petri dishes have a grid of 1 cm squares impressed into the bottom half which contains the nutrient medium. The rows and columns of squares are identified by alphabetic characters (A–G) and numerals (1–7) respectively. Each test compound may thus be assigned a singular location (e.g., C-3, A-5, etc.).

A flame-cleaned microspatula is used to transfer enough compound to cover a small pin head to its given location after inoculation of the organism as above. Compounds are tested on three petri dishes for each organism.

The dishes are incubated at room temperature for 24–48 hours. An active compound inhibits the growth of the organism and so a circular clear area (zone of inhibition) is seen around the compound when viewed against a dark background or in an oblique light. The compound is adjudged active if the zone of inhibition is at least about 0.25 cm. in diameter.

Antiviral activity was determined by the virus rating (VR) method of Sidwell, et al. *Appl. Microbid.* 22, 797 (1971) wherein VR of 0.5–0.9 is taken as indicative of moderate antiviral activity. Falcon Plastics Microtest II plastic panels with a monolayer of KB cells were employed in virus testing.

EXAMPLE 1

3-Chloro-1-(2,3,5-tri-O-acetyl-β-D-ribofuranosyl)-1,2,4-triazole-5-carboxylic acid methyl ester (1) and 5-chloro-1-(2,3,5-tri-O-acetyl-β-D-ribofuranosyl)-1,2,4-triazole-3-carboxylic acid methyl ester (2)

A mixture of 3-chloro-1,2,4-triazole-5-carboxylic acid methyl ester (2.44 g 15.0 mmol) and 1,2,3,5-tetra-O-acetyl-β-D-ribofuranose (4.62 g, 15.0 mmol) was heated at 185° in the presence of bis-(p-nitrophenyl)phosphate (15 mg) under reduced pressure for 15 min. Chromatography of the resulting mixture on silica gel with chloroform: acetone (30:1) provided two products in the following order: (1) 3-chloro-1-(2,3,5-tri-O-acetyl-β-D-ribofuranosyl)-1,2,4-triazole-5-carboxylic acid methyl ester (3.2 g, 50 percent) with mp 89°–90° and (2) 5-chloro-1-(2,3,5-tri-O-acetyl-β-D-ribofuranosyl)-3-carboxylic acid methyl ester (2.3 g, 36 percent) as a syrup.

Anal. (for 1). Calcd for $C_{15}H_{18}ClN_3O_9$: C, 42.91; H, 4.32; Cl, 8.44; N, 10.01. Found: C, 42.73; H, 4.57; Cl, 8.35; N, 10.11.

EXAMPLE 2

3-Chloro-1-β-D-ribofuranosyl-1,2,4-triazole-5-carboxamide (3)

A solution of 3-chloro-1-(2,3,5-tri-O-acetyl-β-D-ribofuranosyl)-1,2,4-triazole-5-carboxylic acid methyl ester (2.5 g) in methanol (200 ml) saturated at 0° was kept in a pressure flask at 25° for 48 hrs. The solvent was removed and the residue was chromatographed on silica gel with ethyl acetate: methanol (19:1) to provide the nucleoside (1.09 g, 71 percent). Crystallization from ethyl acetate-methanol afforded pure material with mp 167.5°–168.5°.

Anal. Calcd for $C_8H_{11}ClN_4O_5$: C, 34.47; H, 3.97; Cl, 12.72, N, 20.10. Found: C, 34.19; H, 4.14; Cl, 12.50; N, 20.00.

Compound 3, in repeated testing against herpes virus type 1, exhibited VR of 0.6, 0.7 and 0.9. Herpes type 1 is implicated in labialis (cold sores), herpes keratitis and herpes encephalitis.

EXAMPLE 3

5-Chloro-1-β-D-ribofuranosyl-1,2,4-triazole-3-carboxamide (4)

A solution of 5-chloro-1-(2,3,5-tri-O-acetyl-β-D-ribofuranosyl)-1,2,4-triazole-3-carboxylic acid methyl ester (2.00 g) in methanol (125 ml) saturated at 0° with ammonia was kept in a pressure bottle at 25° for 16 hrs. The solvent was removed and the residue was triturated with methanol to give the nucleoside (0.60 g). Chromatography of the filtrate on silica gel with ethyl acetate:

methanol (19:1) afforded additional product (0.45 g). Recrystallization from methanol provided pure material with mp 191°–192°. The total yield was 68 percent.

Anal. Calcd for $C_8H_{11}ClN_4O_5$: C, 34.47; H, 3.97; Cl, 12.72; N, 20.10. Found: C, 34.30; H, 3.97; Cl, 12.50; N, 20.09.

EXAMPLE 4

5-Amino-1-β-D-ribofuranosyl-1,2,4-triazole-3-carboxamide (5)

A mixture of 5-chloro-1-β-D-ribofuranosyl-1,2,4-triazole-3-carboxamide (350 mg) and liquid ammonia (20 ml) were heated in a steel pressure vessel at 100° for 24 hrs. Evaporation of the ammonia and crystallization of the product from aqueous ethanol provided 300 mg (92 percent) of the nucleoside with mp 188°–190°.

Anal. Calcd for $C_8H_{13}N_5O_5$: C, 37.07; H, 5.06; N, 27.02. Found: C, 36.90; H, 5.18; N, 27.16.

EXAMPLE 5

1-β-D-Ribofuranosyl-1,2,4-triazole-3-carboxamide-5-thiol (6)

Hydrogen sulfide was bubbled into a solution of sodium methoxide (prepared from 0.60 g of sodium and 20 ml of methanol) for 20 min. and 5-chloro-1-β-D-ribofuranosyl-1,2,4-triazole-3-carboxamide (0.65 g) was added to this solution with stirring. The solution was refluxed for 5½ hrs with continuous addition of hydrogen sulfide. After the solution was cooled and diluted with methanol (50 ml), it was neutralized with Bio-Rad AG50W-X8(H). The resin was removed by filtration and thoroughly washed with methanol. The filtrates were evaporated to dryness. The residue was triturated with carbon disulfide and collected by filtration. Crystallization of the product from water provided pure material (0.51 g, 78 percent) with mp 228°–230°.

Anal. Calcd for $C_8H_{12}N_4O_5S$: C, 35.03; H, 4.38; N, 20.28; S, 11.60. Found: C, 34.89; H, 4.34; N, 20.26; S, 11.60.

Compound 6 proved active against *Pseudomonas aeruginosa*, *Staphylococcus aureas*, *Escherichia coli*, *Streptococcus faecalis* and *Proteus vulgaris*.

EXAMPLE 6

3-Nitro-1-(2,3,5-tri-O-acetyl-β-D-ribofuranosyl)-1,2,4-triazole-5-carboxylic acid methyl ester (7)

A mixture of 3-nitro-1,2,4-triazole-5-carboxylic acid methyl ester (1.00 g, 5.8 mmol) and 1,2,3,5-tetra-O-acetyl-β-D-ribofuranose (1.85 g, 5.8 mmol) were heated at 135° under reduced pressure for 30 min. The mixture was cooled and triturated with ether-methylene chloride to provide 1.92 g (77 percent) of product. Recrystallization from ether afforded pure material with mp 100°–101°.

Anal. Calcd for $C_{15}H_{18}N_4O_{11}$: C, 41.86; H, 4.21; N, 13.02. Found: C, 41.81; H, 4.06; N, 12.88.

Compound 7 proved active against *Streptococcus pyogenes*, a gram positive bacteria associated with strep throat and rheumatic fever.

EXAMPLE 7

3-Nitro-1-β-D-ribofuranosyl-1,2,4-triazole-5-carboxamide

A solution of 3-nitro-1-(2,3,5-tri-O-acetyl-β-D-ribofuranosyl)-1,2,4-triazole-5-carboxylic acid methyl ester (0.60 g) in methanol (30 ml) saturated at 0° with ammonia was kept in a pressure flask at 25° for 48 hrs. The solvent was removed and chromatography of the residue on silica gel with ethyl acetate: methanol (19:1) provided the carboxamide. Crystallization from methanol gave the pure product (100 mg, 24 percent) with mp 160°–161°.

Anal. Calcd for $C_8H_{11}N_5O_7$: C, 33.22; H, 3.83; N, 24.22. Found: C, 32.98; H, 3.90; N, 24.15.

We claim:

1. A compound of structure

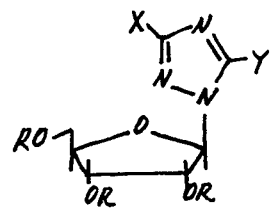

wherein R is hydrogen or $C_1$–$C_{18}$ acyl and wherein X and Y differ and are selected from the group consisting of chloro-, iodo-, bromo, carboxamide, carbomethoxy, and carboethoxy groups.

2. A compound according to claim 1 wherein R is hydrogen or acetyl and wherein X and Y are selected from the group consisting of chlorine, carboxamide, and carbomethoxy groups.

3. A compound according to claim 1 wherein one of X and Y is chloro and the other is carbomethoxy.

4. A compound according to claim 1 wherein one of X and Y is chloro and the other is a carboxamide group.

5. 3-chloro-1-(2,3,5-tri-O-acetyl-β-D-ribofuranosyl)-1,2,4-triazole-5-carboxylic acid methyl ester.

6. 5-chloro-1-β-D-ribofuranosyl-1,2,4-triazole-3-carboxamide.

7. 1-β-D-Ribofuranosyl-1,2,4-triazole-3-carboxamide-5-thiol.

8. 3-Nitro-1-(2,3,5-tri-O-acetyl-β-D-ribofuranosyl)-1,2,4-triazole-5-carboxylic acid methyl ester.

9. 3-Nitro-1-β-D-ribofuranosyl-1,2,4-triazole-5-carboxylic acid methyl ester.

10. A compound of structure

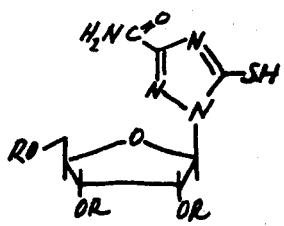

wherein R is hydrogen or $C_1$–$C_{18}$ acyl.

* * * * *